UNITED STATES PATENT OFFICE.

LUDWIG BEREND, OF AMÖNEBURG, GERMANY.

METHOD OF MANUFACTURING PERMANENTLY FUSIBLE AND SOLUBLE SYNTHETIC RESINS FROM NON-FUSIBLE PHENOLALDEHYDERESINS.

1,259,347.  Specification of Letters Patent.  Patented Mar. 12, 1918.

No Drawing.  Application filed June 28, 1915. Serial No. 36,834.

*To all whom it may concern:*

Be it known that I, Dr. LUDWIG BEREND, citizen of Germany, subject of the King of Prussia and Emperor of Germany, residing at Landgrabenweg 14, Amöneburg-on-the-Rhine, in the Grand Duchy of Hesse and Empire of Germany, have invented new and useful Improvements in Methods of Manufacturing Permanently Fusible and Soluble Synthetic Resins from Non-Fusible Phenolaldehyderesins, of which the following is a specification.

The synthetic resins which are obtained by the reaction of formaldehyde on phenols may be divided into three principal classes. The first class comprises the non-fusible and insoluble resins, which when heated to higher temperatures will decompose and carbonize. To the second class belong the barely fusible condensation products, which, when heated, very quickly become non-fusible and insoluble. To the third class are reckoned the resins which even when heated for a prolonged period either remain permanently fusible and soluble, or only very gradually become more or less non-fusible and insoluble.

Of these three classes of resins those of the first class have hitherto obtained the greatest importance, in particular in electrical engineering. Two methods are employed for manufacturing articles from these latter resins. They are either manufactured from the preliminary stages which are still fusible or, at higher temperatures and pressures, still plastic, by heating these in molds at the atmospheric or at an increased pressure, or from completely hardened resin blocks by mechanically working these. For increasing the elasticity, for reducing the price and for other purposes filling materials of various kinds are embodied in the condensation substances from phenols and formaldehydes to be hardened, before they are converted into non-fusible products. Among others, also resins are employed as such filling materials.

I now have observed the surprising and peculiar fact that it is possible to convert such non-fusible resins again into fusible and soluble resins by heating them with natural or synthetic resins of various kinds, also with the aforementioned resins employed as filling materials, to higher temperatures at reduced, ordinary or increased pressure with and without the admixture of acids or acid salts as contact means. This fact is the more surprising because it was not to be expected that the same resins which may be added to the condensation products before they are converted into non-fusible substances by heating them to temperatures which mostly remain below 130°, are able to again render these non-fusible resins fusible at higher temperatures. Also the accelerating effect of the admixture of acids and acid salts on the conversion of the non-fusible substances into fusible substances is very surprising, for the reason that in several specifications it is recommended to add acids and acid salts for increasing the speed of hardening the phenolaldehyde resins. (German Patent 214,194). The rendering soluble of the non-fusible resins may also be effected in the presence or with admixture of bases, basic or neutral salts.

In accordance with these just named observations I have further found that it is possible to prevent by the addition of natural or artificial resins the very rapidly proceeding conversion of the condensation products of the second group into non-fusible products. So for example, it will be possible to not only render again soluble by the aid of natural or artificial resins the completely non-fusible and insoluble resins, which are obtained from o-, m- and p-cresoldialcohols by heating, but also to completely avoid by an addition of these natural or artificial resins the conversion of the cresolalcohol-resins by heating into non-fusible products. Furthermore it is now also possible to produce permanently soluble and fusible resin compounds of any desired degree of hardness by heating suitable mixtures of natural or synthetic resins with such fusible, soluble phenolaldehyde resins of the third class, which by prolonged heating become more and more hard and eventually more or less non-fusible, and will therefore readily burn to the vesel and be carbonized, without there being any danger of these resin compounds being decomposed in the new process.

The great importance of the hereinbefore disclosed invention is, briefly stated, as follows:

Firstly the new method affords the possibility of again converting the large quantities of non-fusible resins, forming the scrap from the mechanical working of non-fusible resins, or obtained as defective or worn articles, in a most simple and economic manner into soluble and fusible substances.

A special advantage of the new method consists in its allowing of removing from articles which, to a certain degree will withstand heat, coatings consisting of non-fusible resins and which have become defective and unserviceable, so that not only these non-fusible resin materials but also the articles coated therewith may be utilized anew. So, for example, metallic wires coated for the purpose of insulation with non-fusible resins may be treated in this manner.

Furthermore the new method, also allows of always converting partly or completely non-fusible resin, which has unintendedly been formed in the condensation process, into utilizable fusible resin.

Neither phenols nor mixtures of phenols can be condensed with formaldehyde alone, with or without contact means, in quantitative proportion to completely fusible and soluble resins. According to the character of the phenol or the mixture of phenols, respectively, and the manner of performing the condensation process it was in this case till now necessary to work with a more or less great surplus of phenol in order to avoid the formation of partly non-fusible products.

With crude cresols, containing about 40% m-cresol, only ⅔ of the cresol employed may be converted by condensation without addition of contact means, into fusible resin. If, however, before or during the condensation sufficient quantities of a fusible artificial or natural resin are added to the reaction masses, it will be possible to convert in one operation all the phenol into fusible resin. If, nevertheless, a conversion into non-fusible resin should occur, it will only be necessary to highly heat the material further with very small quantities of natural or fusible artificial resins, in order to obtain the desired fusible resin.

*Examples.*

(1.) Heat for one hour and a half 50 grams of finely powdered non-fusible cresol resin, obtained by heating 150 grams of fusible cresol resin with 4.5 grams of trioxymethylene, with 50 grams of hot colophony at a temperature of 260-270 degrees cent. The non-fusible resin will dissolve under violent foaming. The resin obtained is soluble, for example, in a cold mixture of alcohol and benzol and may be boiled with linseed oil to a clear varnish.

(2.) Heat 100 grams of coarsely powdered non-fusible resin, which is obtained from crude 60% m-cresol by the aid of hydrochloric acid as contact means, with 150 grams of colophony for 3 hours under pressure at a temperature of 240° C. The extremely hard resin will then completely dissolve in boiling linseed oil.

3.) Heat 75 grams of the artificial infusible resin used in Example 2 for 3 hours under pressure with 125 grams of cumarone resin at 240° C. The resin will then be completely soluble in a mixture of benzol and alcohol.

(4.) Heat 75 grams of the infusible resin used in Examples 2 and 3 in an autoclave (digesting-furnace) for 7 hours with 100 grams of palm resin (gutta resin) to 250° C. Whereas after two hours of heating only partial solution will have resulted, the final product will dissolve clear in a mixture of benzol and alcohol.

(5.) Heat 100 parts of non-fusible resin, which is obtained by condensation of crude cresol without addition of a contact means, with 150 parts of colophony and 10 parts of chlorid of ammonia for 3 hours in a closed vessel at a temperature of 250° C. The resin compound obtained will then completely dissolve in a mixture of benzol and alcohol. The chlorid of ammonia remains undissolved.

(6.) Heat equal parts of p-cresol-di-alcohol and colophony under ordinary pressure at 280° C.; whereas p-cresol-di-alcohol when heated for itself, will very quickly become non-fusible, splitting off formaldehyde and water, this alcohol will dissolve very quickly in the colophony, forming a clear resin compound therewith.

Having now described my invention what I claim and desire to secure by Letters Patent of the United States is:

1. A process for the manufacture of fusible and soluble artificial resins from unmeltable, insoluble phenol-aldehyde resins consisting in heating these non-fusible resins with other resins in the presence of contact media.

2. A process for the manufacture of fusible and soluble artificial resins from unmeltable, insoluble phenol-aldehyde resins consisting in heating these non-fusible resins with other resins in the presence of acid contact media.

In testimony whereof I have hereunto set my hand in presence of two subscribing witnesses.

LUDWIG BEREND.

Witnesses:
HEINRICH LUSTIG,
ELISABETH STOLLENWERK.